United States Patent
Murayama

(10) Patent No.: US 9,134,115 B2
(45) Date of Patent: Sep. 15, 2015

(54) VIBRATING MIRROR ELEMENT, DISTANCE MEASURING APPARATUS, AND PROJECTOR

(71) Applicant: Funai Electric Co., Ltd., Daito-shi, Osaka (JP)

(72) Inventor: Manabu Murayama, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 14/303,010

(22) Filed: Jun. 12, 2014

(65) Prior Publication Data

US 2015/0021483 A1    Jan. 22, 2015

(30) Foreign Application Priority Data

Jul. 22, 2013  (JP) .................................. 2013-151471

(51) Int. Cl.
| | |
|---|---|
| G02B 26/10 | (2006.01) |
| G01B 11/02 | (2006.01) |
| G01S 7/481 | (2006.01) |
| G02B 26/08 | (2006.01) |
| G01S 17/42 | (2006.01) |
| G01S 17/10 | (2006.01) |
| G01S 17/48 | (2006.01) |

(52) U.S. Cl.
CPC ............. *G01B 11/026* (2013.01); *G01S 7/4817* (2013.01); *G01S 17/42* (2013.01); *G02B 26/0858* (2013.01); *G02B 26/101* (2013.01); *G01S 17/10* (2013.01); *G01S 17/48* (2013.01)

(58) Field of Classification Search
CPC .. G02B 26/105; G02B 26/0833; G02B 26/10; G02B 7/1821; G01B 11/14
USPC .......................................................... 250/347
See application file for complete search history.

(56) References Cited

U.S. PATENT DOCUMENTS

| | | | |
|---|---|---|---|
| 7,271,943 B2 | 9/2007 | Yasuda et al. | |
| 7,388,702 B2 | 6/2008 | Yasuda et al. | |
| 7,474,452 B2 | 1/2009 | Yasuda et al. | |
| 7,605,965 B2 | 10/2009 | Tani et al. | |
| 7,605,966 B2 | 10/2009 | Tani et al. | |
| 7,643,198 B2 | 1/2010 | Yasuda et al. | |
| 7,773,282 B2 | 8/2010 | Tani et al. | |
| 8,508,827 B2 * | 8/2013 | Wang et al. ................. | 359/224.1 |
| 8,879,132 B2 * | 11/2014 | Naono ........................ | 359/200.8 |
| 2004/0240017 A1 * | 12/2004 | Kandori et al. ............... | 359/196 |
| 2008/0239252 A1 * | 10/2008 | Konno et al. .................... | 353/98 |
| 2008/0297868 A1 * | 12/2008 | Mizumoto ..................... | 359/199 |
| 2010/0103077 A1 * | 4/2010 | Sugiyama et al. ................ | 345/8 |
| 2012/0026567 A1 * | 2/2012 | Murayama et al. ......... | 359/224.1 |
| 2013/0188043 A1 * | 7/2013 | Decoster ...................... | 348/135 |

FOREIGN PATENT DOCUMENTS

| | | |
|---|---|---|
| JP | 2006-349449 A | 12/2006 |
| JP | 2008-9446 A | 1/2008 |
| JP | 2009-169326 A | 7/2009 |

* cited by examiner

*Primary Examiner* — Marcus Taningco
(74) *Attorney, Agent, or Firm* — Crowell & Moring LLP

(57) ABSTRACT

A vibrating mirror element includes a drive control portion configured to control the driving of a correction drive portion to keep the turning angle velocity of a mirror portion substantially constant by oscillating the mirror portion about an axis at a non-resonance frequency in a direction opposite to a direction in which a resonant drive portion oscillates the mirror portion.

20 Claims, 6 Drawing Sheets

FIG.1 (FIRST EMBODIMENT)

FIG.7 (SECOND EMBODIMENT)

(THIRD EMBODIMENT)

VIBRATING MIRROR ELEMENT, DISTANCE MEASURING APPARATUS, AND PROJECTOR

BACKGROUND OF THE INVENTION

1. Field of the Invention

The present invention relates to a vibrating mirror element, a distance measuring apparatus, and a projector, and more particularly, it relates to a vibrating mirror element, a distance measuring apparatus, and a projector each including a resonant drive portion and a drive control portion controlling the driving of the resonant drive portion.

2. Description of the Background Art

A vibrating mirror element, a distance measuring apparatus, and a projector each including a resonant drive portion and a drive control portion controlling the driving of the resonant drive portion are known in general, as disclosed in Japanese Patent Laying-Open No. 2008-009446.

Japanese Patent Laying-Open No. 2008-009446 discloses an image-forming apparatus having a resonance type light-deflector (vibrating mirror element) for deflecting a laser light, a driving portion (resonant drive portion) for oscillating a first movable element (mirror portion) around an oscillating axis, a driving portion (correction drive portion) for oscillating a second movable element around an oscillating axis, and a driving control portion (drive control portion) for controlling the driving portions. In the resonance type light-deflector of this image-forming apparatus according to Japanese Patent Laying-Open No. 2008-009446, the driving control portion is configured to control the driving portions (the resonant drive portion and the correction drive portion) to oscillate a plurality of movable elements and a system constituted by torsion springs simultaneously at a reference frequency and a frequency of an even multiple of the reference frequency. Thus, the first movable element is configured such that the turning angle velocity is substantially constant during a prescribed period of time in one cycle of the oscillation.

In the resonance type light-deflector disclosed in Japanese Patent Laying-Open No. 2008-009446, however, the period of time when the turning angle velocity of the first movable element can be substantially constant is disadvantageously limited whereas the first movable element is configured such that the turning angle velocity is substantially constant during the prescribed period of time in one cycle of the oscillation.

SUMMARY OF THE INVENTION

The present invention has been proposed in order to solve the aforementioned problem, and an object of the present invention is to provide a vibrating mirror element, a distance measuring apparatus, and a projector each capable of keeping the turning angle velocity of a mirror portion substantially constant during a substantially entire period in one cycle of oscillation of the mirror portion.

In order to attain the aforementioned object, a vibrating mirror element according to a first aspect of the present invention includes a mirror portion capable of being oscillated about an axis, a resonant drive portion resonantly driven at a resonance frequency to resonantly drive the mirror portion by oscillating the mirror portion about the axis, a correction drive portion provided outside the resonant drive portion to be capable of oscillating the mirror portion about the axis, configured to non-resonantly drive the mirror portion by correcting the oscillation driving of the mirror portion, and a drive control portion configured to control the driving of the resonant drive portion to oscillate the mirror portion about the axis at the resonance frequency and to control the driving of the correction drive portion to keep the turning angle velocity of the mirror portion substantially constant by oscillating the mirror portion about the axis at a non-resonance frequency in a direction opposite to a direction in which the resonant drive portion oscillates the mirror portion.

In the vibrating mirror element according to the first aspect of the present invention, as hereinabove described, the driving of the resonant drive portion is controlled to oscillate the mirror portion about the axis at the resonance frequency, and the driving of the correction drive portion is controlled to keep the turning angle velocity of the mirror portion substantially constant by oscillating the mirror portion about the axis at the non-resonance frequency in the direction opposite to the direction in which the resonant drive portion oscillates the mirror portion, whereby the driving of the correction drive portion can be controlled to oscillate the mirror portion at the arbitrary non-resonance frequency unlike the case where the driving of the correction drive portion is controlled to vibrate the mirror portion at the resonance frequency and a frequency of an even multiple of the resonance frequency, and hence the degree of freedom of control of the correction drive portion can be increased. Consequently, the turning angle velocity of the mirror portion can be kept substantially constant during a substantially entire period in one cycle of the oscillation. Furthermore, in the case where a vibrating mirror element in which the turning angle velocity is not constant is applied to a distance measuring apparatus, for example, a laser light source must be pulse-driven in order to emit laser light at a regular angular interval, and the pulse-drive timing must be temporally corrected. On the other hand, according to the present invention, the turning angle velocity of the mirror portion can be kept substantially constant during the substantially entire period in one cycle of the oscillation, and hence a distance measuring apparatus requires no control means configured to perform pulse control on laser light, so that the structure of the distance measuring apparatus can be simplified.

In the aforementioned vibrating mirror element according to the first aspect, the drive control portion is preferably configured to control the driving of the correction drive portion such that a mirror portion oscillation angle in oscillation of the mirror portion by the correction drive portion is 20% or less of the maximum value of the mirror portion oscillation angle in oscillation of the mirror portion by the resonant drive portion. According to this structure, an increase in the size of the correction drive portion can be suppressed, unlike the case where the driving of the correction drive portion is controlled such that the mirror portion oscillation angle in the oscillation of the mirror portion by the correction drive portion is more than 20% of the maximum value of the mirror portion oscillation angle in the oscillation of the mirror portion by the resonant drive portion. Furthermore, when the mirror portion oscillation angle obtained by the correction drive portion is 20% or less of the maximum value of the mirror portion oscillation angle obtained by the resonant drive portion, the suppression of the increase in the size of the correction drive portion can be easily achieved even if non-resonance driving is employed.

In the aforementioned vibrating mirror element according to the first aspect, the drive control portion is preferably configured to control the driving of the resonant drive portion to satisfy the following expression (1) and control the driving of the correction drive portion to satisfy the following expression (2) when a mirror portion oscillation angle at time t is f(t), the maximum value of the mirror portion oscillation angle is $A$, and the oscillation angle frequency of the mirror portion is $\omega$.

$$f_0(t) = A \cdot \sin(\omega t) \quad (1)$$

$$f_1(t) = A \cdot \sum_{n=1}^{\infty} \frac{B}{\pi^2}\left(\frac{1}{n^2}\sin\left(\frac{n\pi}{2}\right) \cdot \sin(n\omega t)\right) \quad (2)$$

According to this structure, the mirror portion oscillation angle of the mirror portion has a waveform represented as a triangular wave, and hence the turning angle velocity of the mirror portion can be effectively kept substantially constant during the substantially entire period in one cycle of the oscillation except for when the displacement direction of the mirror portion is switched.

In the aforementioned vibrating mirror element according to the first aspect, the waveform of a mirror portion oscillation angle in oscillation of the mirror portion by the correction drive portion preferably includes a waveform having a difference value between the mirror portion oscillation angle obtained by the driving of the resonant drive portion and the angle of a triangular wave in the case where the turning angle velocity is substantially constant at each time, when the waveform of the angle in the case where the turning angle velocity is substantially constant is represented by the triangular wave. According to this structure, the turning angle velocity of the mirror portion can be easily kept substantially constant.

The aforementioned vibrating mirror element according to the first aspect preferably further includes a resonant drive circuit connected to the drive control portion, configured to drive the resonant drive portion to oscillate the mirror portion about the axis at the resonance frequency and a correction drive circuit configured to drive the correction drive portion to keep the turning angle velocity of the mirror portion substantially constant by oscillating the mirror portion about the axis at the non-resonance frequency in the direction opposite to the direction in which the resonant drive portion oscillates the mirror portion. According to this structure, the resonant drive circuit and the correction drive circuit are driven in a coordinated manner, whereby the correction drive portion can be easily driven such that the turning angle velocity of the mirror portion is kept substantially constant.

In the aforementioned vibrating mirror element according to the first aspect, a pair of correction drive portions are preferably provided outside the resonant drive portion to hold the resonant drive portion therebetween. According to this structure, the mirror portion is corrected from both sides of the resonant drive portion unlike the case where the correction drive portion is provided only on one side of the resonant drive portion outside the resonant drive portion, and hence the turning angle velocity of the mirror portion can be more accurately kept substantially constant.

In this case, the pair of correction drive portions provided to hold the resonant drive portion therebetween preferably have a substantially identical structure and are preferably configured to be substantially point-symmetric with each other about the center of the mirror portion. According to this structure, the pair of correction drive portions perform the same operation with respect to the same voltage, and hence the correction drive portions can be easily controlled.

In the aforementioned vibrating mirror element in which the pair of correction drive portions are provided outside the resonant drive portion to hold the resonant drive portion therebetween, a pair of resonant drive portions are preferably provided in a direction orthogonal to the axis and are preferably configured to be deformed in directions opposite to each other, and the pair of correction drive portions provided to hold the resonant drive portions therebetween are preferably configured to be driven in directions opposite to each other. According to this structure, the resonant drive portions deformed in the directions opposite to each other can be corrected such that the turning angle velocity of the mirror portion is kept substantially constant.

In the aforementioned vibrating mirror element according to the first aspect, the correction drive portion preferably has a meander shape to intersect with the axis a plurality of times. According to this structure, the inclination angle of the correction drive portion deformed a plurality of times can be accumulated, and hence the mirror portion can be oscillated at a larger oscillation angle, unlike the case where the correction drive portion has a shape to intersect with the axis only once.

In this case, the correction drive portion preferably includes a plurality of drive portions formed to extend in a direction orthogonal to the axis and a coupling support portion formed to extend in a direction along the axis, coupling the plurality of drive portions to each other. According to this structure, the correction drive portion can be easily formed in the meander shape to intersect with the axis the plurality of times.

In the aforementioned vibrating mirror element in which the correction drive portion has the meander shape to intersect with the axis the plurality of times, the plurality of drive portions are preferably configured such that voltages opposite in phase to each other are applied to adjacent drive portions. According to this structure, a first end of each of the drive portions can be a free end, and a second end thereof can be a fixed end.

In the aforementioned vibrating mirror element according to the first aspect, the resonant drive portion is preferably arranged to surround the mirror portion and is preferably deformably fixed inside a frame, and the correction drive portion is preferably deformably fixed outside the frame. According to this structure, oscillation of the entire mirror portion arranged inside the frame can be corrected by the correction drive portion arranged outside the frame, and hence the turning angle velocity of the entire mirror portion can be kept substantially constant.

In the aforementioned vibrating mirror element according to the first aspect, the resonant drive portion and the correction drive portion preferably include a piezoelectrically driven actuator. According to this structure, the response speed of the piezoelectrically driven actuator is faster than that of an electromagnetically-driven or electrostatically-driven actuator, and hence the correction drive portion can be promptly driven. Consequently, the correction drive portion can easily oscillate the mirror portion at the arbitrary non-resonance frequency.

In this case, the piezoelectrically driven actuator preferably includes a piezoelectric element layer formed on the upper surface of a Si substrate, having a structure obtained by stacking a lower electrode, a piezoelectric body, and an upper electrode from the side of the Si substrate. According to this structure, the actuator can be easily formed on the frame (Si substrate).

A distance measuring apparatus according to a second aspect of the present invention includes a light emitting portion including a vibrating mirror element emitting laser light to a measurement object, a light receiving portion detecting the laser light emitted from the vibrating mirror element and reflected by the measurement object, and a distance measuring portion acquiring a distance from the measurement object on the basis of a detection result of the light receiving portion, while the vibrating mirror element includes a mirror portion capable of being oscillated about an axis, a resonant drive portion resonantly driven at a resonance frequency to resonantly drive the mirror portion by oscillating the mirror portion about the axis, a correction drive portion provided outside the resonant drive portion to be capable of oscillating the mirror portion about the axis, configured to non-resonantly drive the mirror portion by correcting the oscillation driving of the mirror portion, and a drive control portion configured to control the driving of the resonant drive portion to oscillate the mirror portion about the axis at the resonance frequency and to control the driving of the correction drive portion to keep the turning angle velocity of the mirror portion substantially constant by oscillating the mirror portion about the axis at a non-resonance frequency in a direction opposite to a direction in which the resonant drive portion oscillates the mirror portion.

In the distance measuring apparatus according to the second aspect of the present invention, as hereinabove described, the driving of the resonant drive portion is controlled to oscillate the mirror portion about the axis at the resonance frequency, and the driving of the correction drive portion is controlled to keep the turning angle velocity of the mirror portion substantially constant by oscillating the mirror portion about the axis at the non-resonance frequency in the direction opposite to the direction in which the resonant drive portion oscillates the mirror portion, whereby the driving of the correction drive portion can be controlled to oscillate the mirror portion at the arbitrary non-resonance frequency, and hence the degree of freedom of control of the correction drive portion can be increased. Consequently, the turning angle velocity of the mirror portion can be kept substantially constant during a substantially entire period in one cycle of the oscillation. Furthermore, in the case where a vibrating mirror element in which the turning angle velocity is not constant is applied to the distance measuring apparatus, for example, a laser light source must be pulse-driven in order to emit laser light at a regular angular interval, and the pulse-drive timing must be temporally corrected. On the other hand, according to the present invention, the turning angle velocity of the mirror portion can be kept substantially constant during the substantially entire period in one cycle of the oscillation, and hence the distance measuring apparatus requires no control means configured to perform pulse control on the laser light, so that the distance measuring apparatus in which the structure of the light emitting portion of the distance measuring apparatus can be simplified can be provided.

In the aforementioned distance measuring apparatus according to the second aspect, the drive control portion is preferably configured to control the driving of the correction drive portion such that a mirror portion oscillation angle in oscillation of the mirror portion by the correction drive portion is 20% or less of the maximum value of the mirror portion oscillation angle in oscillation of the mirror portion by the resonant drive portion. According to this structure, an increase in the size of the correction drive portion can be suppressed, unlike the case where the driving of the correction drive portion is controlled such that the mirror portion oscillation angle in the oscillation of the mirror portion by the correction drive portion is more than 20% of the maximum value of the mirror portion oscillation angle in the oscillation of the mirror portion by the resonant drive portion. Furthermore, when the mirror portion oscillation angle obtained by the correction drive portion is 20% or less of the maximum value of the mirror portion oscillation angle obtained by the resonant drive portion, the suppression of the increase in the size of the correction drive portion can be easily achieved even if non-resonance driving is employed.

In the aforementioned distance measuring apparatus according to the second aspect, the drive control portion is preferably configured to control the driving of the resonant drive portion to satisfy the following expression (1) and control the driving of the correction drive portion to satisfy the following expression (2) when a mirror portion oscillation angle at time t is f(t), the maximum value of the mirror portion oscillation angle is $\underline{A}$, and the oscillation angle frequency of the mirror portion is $\omega$.

$$f_0(t) = A \cdot \sin(\omega t) \quad (1)$$

$$f_1(t) = A \cdot \sum_{n=1}^{\infty} \frac{B}{\pi^2} \left( \frac{1}{n^2} \sin\left(\frac{n\pi}{2}\right) \cdot \sin(n\omega t) \right) \quad (2)$$

According to this structure, the mirror portion oscillation angle of the mirror portion has a waveform represented as a triangular wave, and hence the turning angle velocity of the mirror portion can be effectively kept substantially constant during the substantially entire period in one cycle of the oscillation except for when the displacement direction of the mirror portion is switched.

In the aforementioned distance measuring apparatus according to the second aspect, a pair of correction drive portions are preferably provided outside the resonant drive portion to hold the resonant drive portion therebetween. According to this structure, the mirror portion is corrected from both sides of the resonant drive portion unlike the case where the correction drive portion is provided only on one side of the resonant drive portion outside the resonant drive portion, and hence the turning angle velocity of the mirror portion can be more accurately kept substantially constant.

In the aforementioned distance measuring apparatus according to the second aspect, the correction drive portion preferably has a meander shape to intersect with the axis a plurality of times. According to this structure, the inclination angle of the correction drive portion deformed a plurality of times can be accumulated, and hence the mirror portion can be oscillated at a larger oscillation angle, unlike the case where the correction drive portion has a shape to intersect with the axis only once.

A projector according to a third aspect of the present invention includes a vibrating mirror element including a scanning mirror portion oscillated about an axis, projecting an image, a resonant drive portion resonantly driven at a resonance frequency to resonantly drive the scanning mirror portion by oscillating the scanning mirror portion about the axis, a correction drive portion provided outside the resonant drive portion to be capable of oscillating the scanning mirror portion about the axis, configured to non-resonantly drive the scanning mirror portion by correcting the oscillation driving of the scanning mirror portion, and a drive control portion configured to control the driving of the resonant drive portion to oscillate the scanning mirror portion about the axis at the resonance frequency and to control the driving of the correction drive portion to keep the turning angle velocity of the scanning mirror portion substantially constant by oscillating the scanning mirror portion about the axis at a non-resonance frequency in a direction opposite to a direction in which the resonant drive portion oscillates the scanning mirror portion.

In the projector according to the third aspect of the present invention, as hereinabove described, the driving of the resonant drive portion is controlled to oscillate the mirror portion about the axis at the resonance frequency, and the driving of the correction drive portion is controlled to keep the turning angle velocity of the mirror portion substantially constant by oscillating the mirror portion about the axis at the non-resonance frequency in the direction opposite to the direction in which the resonant drive portion oscillates the mirror portion, whereby the driving of the correction drive portion can be controlled to oscillate the mirror portion at the arbitrary non-resonance frequency unlike the case where the driving of the correction drive portion is controlled to vibrate the mirror portion at the resonance frequency and a frequency of an even multiple of the resonance frequency, and hence the degree of freedom of control of the correction drive portion can be increased. Consequently, the projector in which the turning angle velocity of the mirror portion can be kept substantially constant during a substantially entire period in one cycle of the oscillation can be provided.

According to the present invention, as hereinabove described, the vibrating mirror element, the distance measuring apparatus, and the projector each in which the turning angle velocity of the mirror portion can be kept substantially constant during the substantially entire period in one cycle of the oscillation of the mirror portion can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a distance measuring apparatus 100 according to a first embodiment of the present invention is now described with reference to FIGS. 1 to 6.

Figure 1:
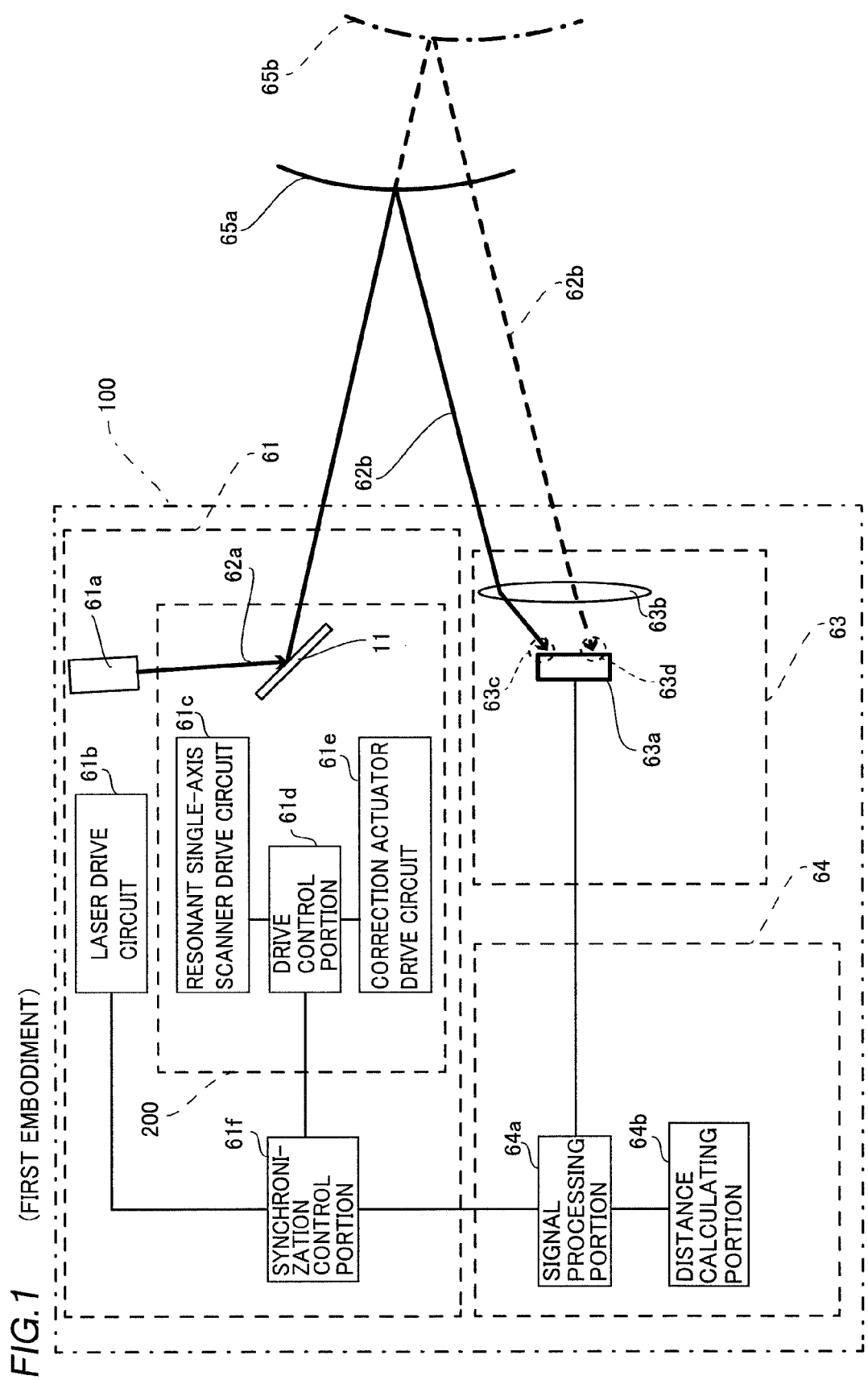
FIG. 1 is a block diagram showing the structure of a distance measuring apparatus according to a first embodiment of the present invention.

The distance measuring apparatus 100 according to the first embodiment of the present invention includes a light emitting portion 61, a light receiving portion 63 receiving laser light 62a emitted from the light emitting portion 61 and reflected by an measurement object 65a, and a distance measuring portion 64 acquiring a distance from the measurement object 65a on the basis of the detection result of the light receiving portion 63, as shown in FIG. 1.

The light emitting portion 61 includes a CW (continuous wave) laser light source 61a emitting the laser light 62a of an infrared wavelength region, a laser drive circuit 61b configured to drive the CW laser light source 61a, a vibrating mirror element 200 configured to deflect the laser light 62a emitted from the CW laser light source 61a, and a synchronization control portion 61f electrically connected to the vibrating mirror element 200 and the laser drive circuit 61b, as shown in FIG. 1. The synchronization control portion 61f controls the CW laser light source 61a and the vibrating mirror element 200 to be driven synchronously and transmits a synchronizing signal obtained by the synchronous driving to a signal processing portion 64a described later, electrically connected to the synchronization control portion 61f.

The light receiving portion 63 includes a condensing lens 63b configured to condense reflected light 62b reflected by the measurement object 65a and a PSD (position sensitive detector) 63a capable of detecting the position of the reflected light 62b transmitted through the condensing lens 63b, as shown in FIG. 1 and transmits a light receiving position signal obtained by receiving the light through the PSD 63a to the signal processing portion 64a described later, electrically connected to the PSD 63a. The light receiving position signal includes information indicating that the reflected light 62b has been received at a light receiving position 63c when the laser light 62a is reflected by the measurement object 65a and information indicating that the reflected light 62b has been received at a light receiving position 63d when the laser light 62a is reflected by a measurement object 65b.

In the distance measuring portion 64, a signal processing portion 64a processing the synchronization signal and the light receiving position signal and a distance calculating portion 64b are electrically connected to each other, as shown in FIG. 1, and the distance calculating portion 64b is configured to calculate a distance from the distance measuring apparatus 100 to the measurement object 65a from geometric arrangement relationship (triangulation method) on the basis of information from the signal processing portion 64a.

Figure 2:
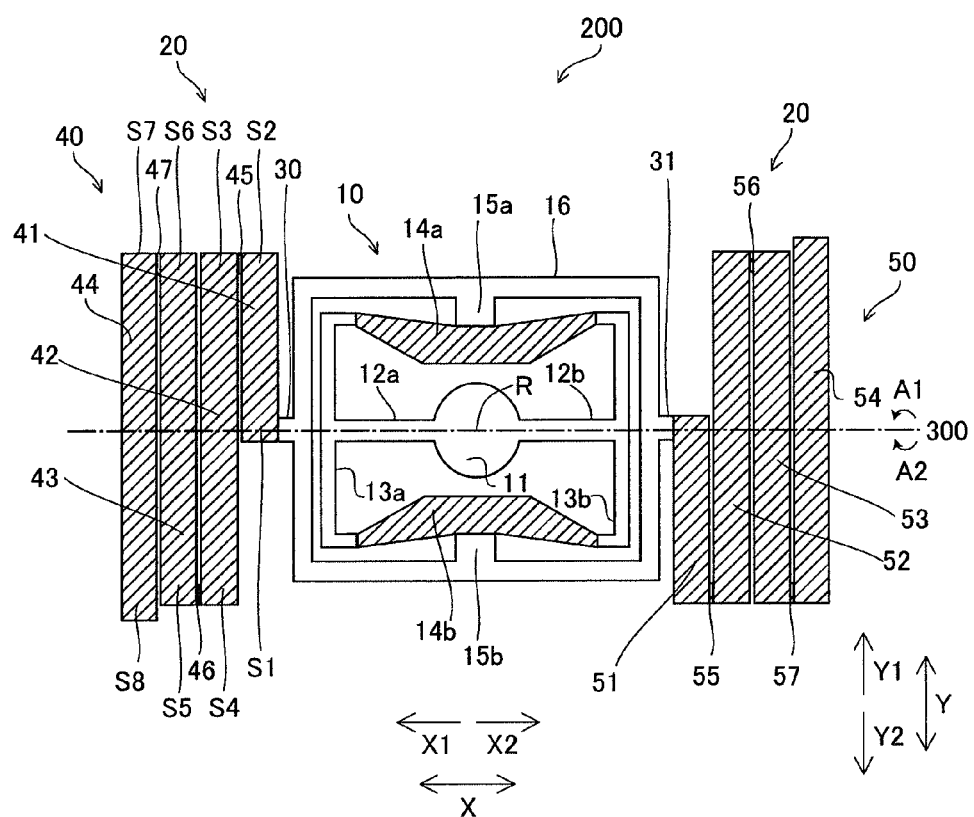
FIG. 2 is a plan view showing the structure of a vibrating mirror element according to the first embodiment of the present invention.

According to the first embodiment, the vibrating mirror element 200 includes a light scanning portion 10 and light scanning angular velocity correction portions 20, as shown in FIG. 2. The light scanning portion 10 includes a mirror 11 configured to reflect the laser light 62a, torsion bars 12a and 12b configured to be capable of vibrating the mirror 11 about an axis 300, inclinable bars 13a and 13b, resonant drive portions 14a and 14b connected to the bars 13a and 13b, fixing portions 15a and 15b fixing the resonant drive portions 14a an 14b, and a frame 16 deformably connected to the fixing portions 15a and 15b. According to the first embodiment, this frame 16 is formed in a frame shape to surround the mirror 11, the torsion bars 12a and 12b, the bars 13a and 13b, the resonant drive portions 14a and 14b, and the fixing portions 15a and 15b in a plan view.

Rotation shafts 30 and 31 are formed on both sides of the frame 16 in a direction X to extend in the direction X on the axis 300. The rotation shaft 30 is deformably connected to the outside of the frame 16 of the light scanning portion 10 on an X2 side and is connected to a correction drive portion 40, described later, of one light scanning angular velocity correction portion 20 on an X1 side. The rotation shaft 31 is deformably connected to the outside of the frame 16 of the light scanning portion 10 on an X1 side and is connected to a correction drive portion 50, described later, of another light scanning angular velocity correction portion 20 on an X2 side.

According to the first embodiment, both the rotation shafts 30 and 31 are formed to function as axes when the light scanning angular velocity correction portions 20 oscillate the light scanning portion 10 (mirror 11) about the axis 300 along arrow A1 and arrow A2, as shown in FIG. 2. A pair of correction drive portions 40 and 50 are arranged to hold the light scanning portion 10 therebetween in the direction X.

According to the first embodiment, the correction drive portion 40 includes four drive portions 41, 42, 43, and 44 and three coupling support portions 45, 46, and 47 and has a meander shape to intersect with the axis 300, as shown in FIG. 2. Similarly, the correction drive portion 50 includes four drive portions 51, 52, 53, and 54 and three coupling support portions 55, 56, and 57 and has a meander shape to intersect with the axis 300.

Figure 3:
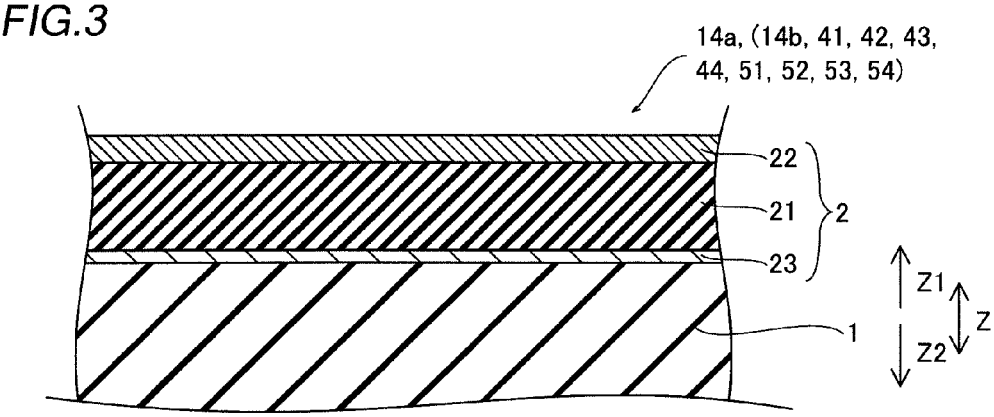
FIG. 3 is an enlarged sectional view showing the structure of a resonant drive portion and a correction drive portion according to the first embodiment of the present invention.
Figure 4:
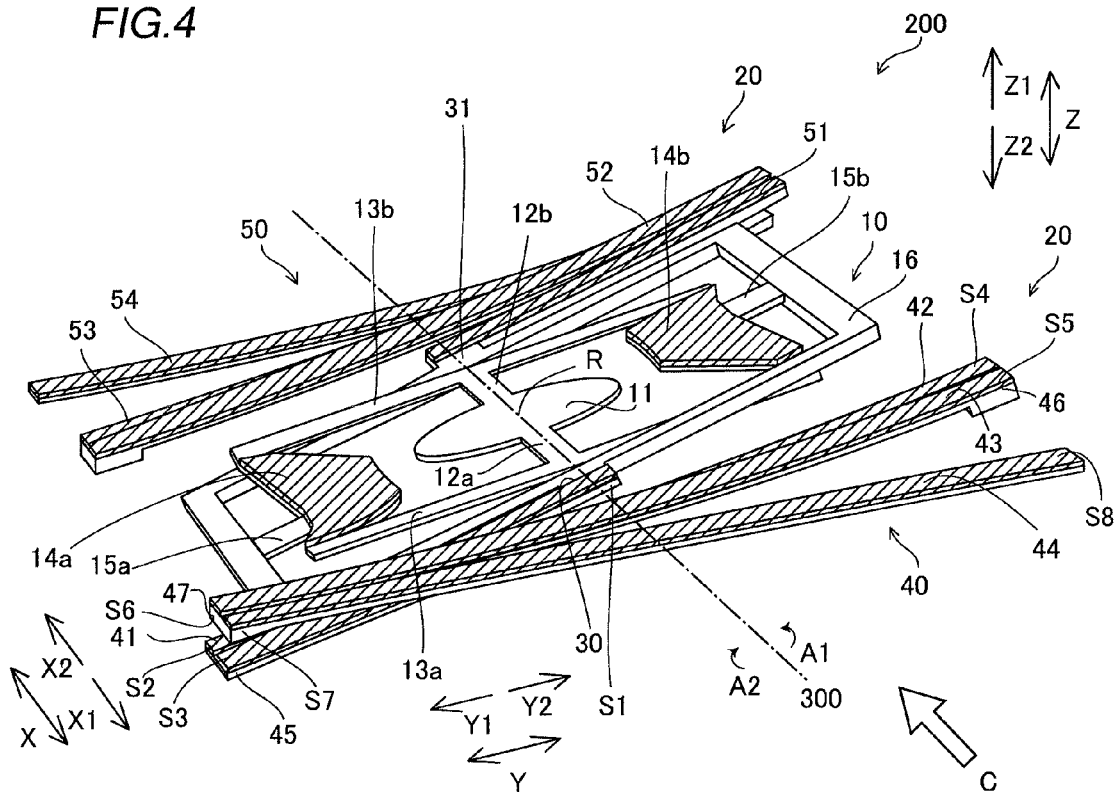
FIG. 4 is a perspective view showing the vibrating mirror element according to the first embodiment of the present invention inclined along arrow A1.

As shown in FIG. 3, in each of the resonant drive portions 14a and 14b of the light scanning portion 10, a piezoelectric element layer 2 is formed on the upper surface (on a Z1 side) of a Si substrate 1. Thus, the resonant drive portions 14a and 14b are applied with voltages from a resonant single-axis scanner drive circuit 61c described later thereby being deformed in a concave shape or a convex shape in a direction Z, using the fixing portions 15a and 15b as fixed ends, as shown in FIG. 4. These resonant drive portions 14a and 14b are deformed in directions opposite to each other, whereby the mirror 11 can be inclined along arrow A1 or arrow A2 about the axis 300. According to the first embodiment, the light scanning portion 10 repeats this deformation movement at a resonance frequency to oscillate the mirror 11 at the resonance frequency about the axis 300 and scan light.

As shown in FIG. 3, the piezoelectric element layer 2 has a structure obtained by stacking a lower electrode 20, a piezoelectric body 21, and an upper electrode 22 from the side of the Si substrate 1 (a Z2 side). The lower electrode 20 is made of Ti, Pt, or the like and is formed on the entire upper surface of the Si substrate 1. Thus, wiring on the lower electrode 20 of the piezoelectric element layer 2 can be performed with respect to an arbitrary portion of the Si substrate 1. The piezoelectric body 21 is made of lead zirconate titanate (PZT) and is polarized in the thickness direction (direction Z) to expand and contract when a voltage is applied. The upper electrode 22 is made of a conductive metal material such as Al, Cr, Cu, Au, or Pt.

According to the first embodiment, each of the drive portions 41, 42, 43, and 44 and the drive portions 51, 52, 53, and 54 has a structure similar to those of the resonant drive portions 14a and 14b, as shown in FIG. 3. In other words, the piezoelectric element layer 2 is formed on the upper surface (on the Z1 side) of the Si substrate 1. Furthermore, a voltage is applied from a correction actuator drive circuit 61e described later, whereby each of the drive portions 41, 42, 43, and 44 and the drive portions 51, 52, 53, and 54 is deformed. The coupling support portions 45, 46, and 47 and the coupling support portions 55, 56, and 57 each are formed with no piezoelectric element layer, are almost not deformed, and function as a piezoelectrically driven actuator.

As shown in FIG. 2, the correction drive portion 40 formed on the X1 side of the light scanning portion 10 and the correction drive portion 50 formed on the X2 side of the light scanning portion 10 have structures similar to each other and are substantially point-symmetric with each other about the center R of the mirror 11. In other words, the drive portions 51, 52, 53, and 54 and the coupling support portions 55, 56, and 57 of the correction drive portion 50 are arranged to substantially overlap with the drive portions 41, 42, 43, and 44 and the coupling support portions 45, 46, and 47, respectively, if the drive portions 51, 52, 53, and 54 and the coupling support portions 55, 56, and 57 are rotated by 180 degrees about the center R of the mirror 11.

Specifically, the drive portions 41, 42, 43, and 44 of the correction drive portion 40 are formed to extend in a direction Y orthogonal to the axis 300, as shown in FIG. 2. The coupling support portions 45, 46, and 47 are formed to extend in the direction X along the axis 300.

As shown in FIG. 2, in the correction drive portion 40, the four drive portions 41, 42, 43, and 44 are connected to each other by the three coupling support portions 45, 46, and 47, whereby one drive portion is formed. Thus, an end of the drive portion 41 on a Y2 side serving as a first end of the correction drive portion 40 becomes a free end S1, and an end of the drive portion 41 on a Y1 side becomes a fixed end S2. Furthermore, an end of the drive portion 42 on the Y1 side becomes a free end S3, and an end of the drive portion 42 on the Y2 side becomes a fixed end S4. In addition, an end of the drive portion 43 on the Y2 side becomes a free end S5, and an end of the drive portion 43 on the Y1 side becomes a fixed end S6. Moreover, an end of the drive portion 44 on the Y1 side becomes a free end S7, and an end of the drive portion 44 on the Y2 side becomes a fixed end S8.

In the correction drive portion 40, the drive portions 41 to 44 are applied with the voltages to be deformed and driven. The voltage applied to the drive portions 41 and 43 and the voltage applied to the drive portions 42 and 44 are opposite in phase to each other.

According to the first embodiment, a drive control portion 61d is electrically connected to the resonant single-axis scanner drive circuit 61c configured to drive the resonant drive portions 14a and 14b to oscillate the mirror 11 about the axis 300 at the resonance frequency and the correction actuator drive circuit 61e configured to drive the correction drive portions 40 and 50 to keep the turning angle velocity of the mirror 11 substantially constant by oscillating the mirror 11 about the axis 300 at a non-resonance frequency in a direction opposite to a direction in which the resonant drive portions 14a and 14b oscillate the mirror 11. The drive control portion 61d is configured to control the driving of the correction drive portions 40 and 50 such that the mirror portion oscillation angle in the oscillation of the mirror 11 by the correction drive portions 40 and 50 is 20% (A/5) or less of the maximum value A of the mirror portion oscillation angle in the oscillation of the mirror 11 by the resonant drive portions 14a and 14b. The resonant single-axis scanner drive circuit 61c is an example of the "resonant drive circuit" in the present invention. The correction actuator drive circuit 61e is an example of the "correction drive circuit" in the present invention.

The drive control portion 61d controls the resonant single-axis scanner drive circuit 61c to satisfy the following expression (3) and controls the correction actuator drive circuit 61e to satisfy the following expression (4) when the mirror portion oscillation angle at time t is f (t), the maximum value of the mirror portion oscillation angle is A, and the oscillation angle frequency of the mirror 11 is ω.

$$f_0(t) = A \cdot \sin(\omega t) \quad (3)$$

$$f_1(t) = A \cdot \sum_{n=1}^{\infty} \frac{B}{\pi^2} \left( \frac{1}{n^2} \sin\left(\frac{n\pi}{2}\right) \cdot \sin(n\omega t) \right) \quad (4)$$

The turning angle velocity of the vibrating mirror element 200 according to the first embodiment is now described with reference to FIG. 5.

Figure 5:
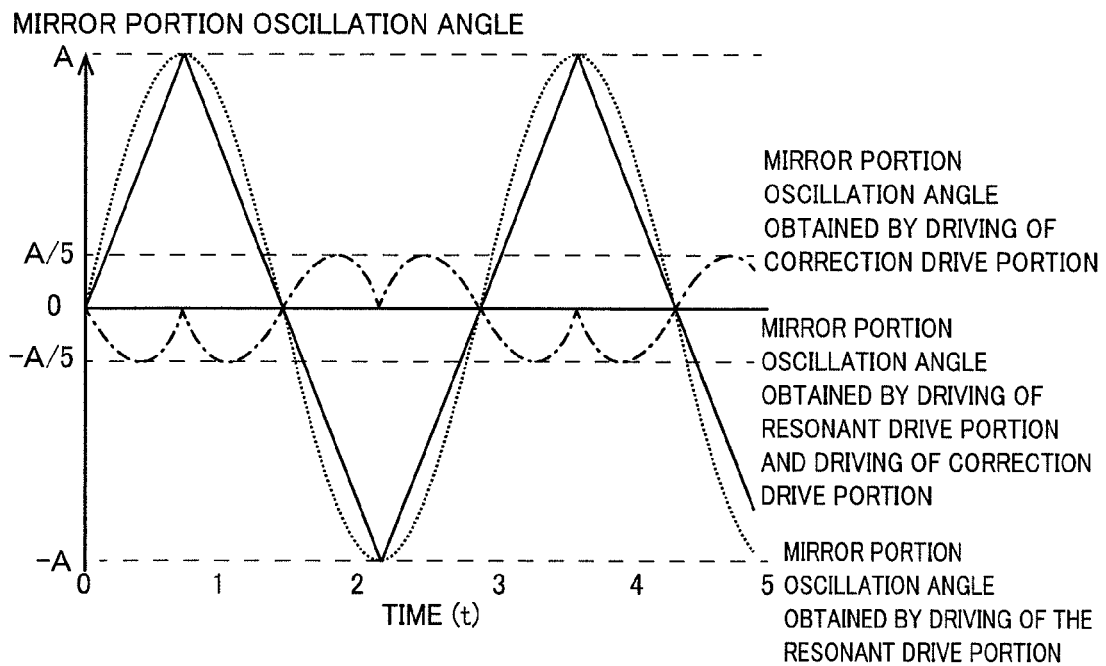
FIG. 5 is a graph for illustrating a time change in the mirror portion oscillation angle of the vibrating mirror element according to the first embodiment of the present invention.

As shown in FIG. 5, the waveform of the mirror portion oscillation angle (dotted line) obtained by the driving of the resonant drive portions 14a and 14b is a sin waveform. The mirror portion oscillation angle (one-dot chain line) obtained by the driving of the correction drive portions 40 and 50 has a non-resonant waveform. Specifically, the mirror portion oscillation angle (one-dot chain line) obtained by the driving of the correction drive portions 40 and 50 includes a waveform having a difference value between the mirror portion oscillation angle (dotted line) obtained by the driving of the resonant drive portions 14a and 14b and the angle of a triangular wave (solid line) in the case where the turning angle velocity is substantially constant at each time, when the waveform of the angle in the case where the turning angle velocity is substantially constant is represented by the triangular wave (solid line). In other words, the mirror portion oscillation angle (one-dot chain line) obtained by the driving of the correction drive portions 40 and 50 is about 0 when the mirror portion oscillation angle (dotted line) obtained by the driving of the resonant drive portions 14a and 14b is 0 or a maximum A in one cycle of the mirror portion oscillation angle (dotted line) obtained by the driving of the resonant drive portions 14a and 14b. Consequently, the mirror portion oscillation angle (solid line) obtained by the driving of the resonant drive portions 14a and 14b and the driving of the correction drive portions 40 and 50 obtained by adding the mirror portion oscillation angle (dotted line) obtained by the driving of the resonant drive portions 14a and 14b and the mirror portion oscillation angle (one-dot chain line) obtained by the driving of the correction drive portions 40 and 50 has a substantially triangular waveform. Thus, the turning angle velocity of the mirror 11 is kept substantially constant during a substantially entire period in one cycle of the oscillation.

Operations for driving the light scanning angular velocity correction portions 20 of the vibrating mirror element 200 according to the first embodiment of the present invention are now described with reference to FIGS. 2, 4, and 6.

In a state where the non-driven correction drive portions 40 and 50 are kept in a horizontal position, as shown in FIG. 2, the voltage is applied from the correction actuator drive circuit 61e to the drive portions 41 and 43 of the correction drive portion 40 and the drive portions 52 and 54 of the correction drive portion 50 such that the upper surface side (Z1 side) of the piezoelectric element layer 2 contracts more than the lower surface side (Z2 side) thereof. On the other hand, the voltage whose phase is opposite to that of the voltage applied to the drive portions 41, 43, 52, and 54 is applied to the drive portions 42 and 44 of the correction drive portion 40 and the drive portions 51 and 53 of the correction drive portion 50 such that the lower surface side (Z2 side) of the piezoelectric element layer 2 contracts more than the upper surface side (Z1 side) thereof.

Figure 6:
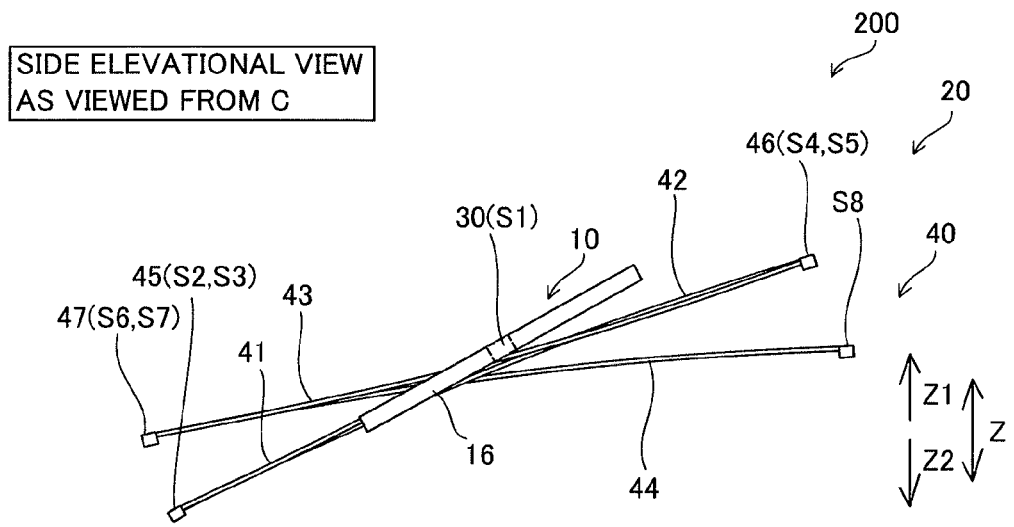
FIG. 6 is a side elevational view showing the vibrating mirror element according to the first embodiment of the present invention inclined along arrow A1, as viewed from a C side in FIG. 4.

Thus, in the correction drive portion 40, the drive portions 41 and 43 are deformed such that the free end S1 and the end S5 are inclined upward (Z1 side) with respect to the end S2 and the end S6, respectively, as shown in FIG. 6. On the other hands, the drive portions 42 and 44 are deformed such that the end S3 and the end S7 are inclined downward (Z2 side) with respect to the end S4 and the end S8, respectively. Consequently, the rotation shaft 30 connected to the free end S1 is inclined such that the Y2 side of the light scanning portion 10 is located above (Z1 side) the Y1 side thereof in a state where the inclination of the drive portions 41 to 44 is accumulated. The correction drive portion 50 is driven oppositely (in a direction opposite) to the correction drive portion 40, whereby the rotation shaft 31 is inclined such that the Y2 side of the light scanning portion 10 is located above (Z1 side) the Y1 side thereof in a state where the inclination of the drive portions 51 to 54 is accumulated. Thus, the light scanning portion 10 is rotated along arrow A1 about the axis 300.

In the state where the non-driven correction drive portions 40 and 50 are kept in the horizontal position, as shown in FIG. 2, the voltage is applied to the drive portions 41 and 43 of the correction drive portion 40 and the drive portions 52 and 54 of the correction drive portion 50 such that the lower surface side (Z2 side) of the piezoelectric element layer 2 contracts more than the upper surface side (Z1 side) thereof. On the other hand, the voltage whose phase is opposite to that of the voltage applied to the drive portions 41, 43, 52, and 54 is applied to the drive portions 42 and 44 of the correction drive portion 40 and the drive portions 51 and 53 of the correction drive portion 50 such that the upper surface side (Z1 side) of the piezoelectric element layer 2 contracts more than the lower surface side (Z2 side) thereof.

Thus, the correction drive portion 40 is driven to be in a state opposite to the state shown in FIG. 6, whereby the rotation shaft 30 is inclined such that the Y2 side of the light scanning portion 10 is located below (Z2 side) the Y1 side thereof in a state where the inclination of the drive portions 41 to 44 is accumulated. The correction drive portion 50 is driven oppositely to the correction drive portion 40, whereby the rotation shaft 31 is inclined such that the Y2 side of the light scanning portion 10 is located below (Z2 side) the Y1 side thereof in a state where the inclination of the drive portions 51 to 54 is accumulated. Thus, the light scanning portion 10 is rotated along arrow A2 about the axis 300.

According to the first embodiment, as hereinabove described, the vibrating mirror element 200 includes the mirror 11 capable of being oscillated about the axis 300, the resonant drive portions 14a and 14b resonantly driven at the resonance frequency to resonantly drive the mirror 11 by oscillating the mirror 11 about the axis 300, the correction drive portions 40 and 50 provided outside the resonant drive portions 14a and 14b to be capable of oscillating the mirror 11 about the axis 300, configured to non-resonantly drive the mirror 11 by correcting the oscillation driving of the mirror 11, and the drive control portion 61d configured to control the driving of the resonant drive portions 14a and 14b to oscillate the mirror 11 about the axis 300 at the resonance frequency and to control the driving of the correction drive portions 40 and 50 to keep the turning angle velocity of the mirror 11 substantially constant by oscillating the mirror 11 about the axis 300 at the non-resonance frequency in the direction opposite to the direction in which the resonant drive portions 14a and 14b oscillate the mirror 11. Thus, the driving of the correction drive portions 40 and 50 can be controlled to oscillate the mirror 11 at the arbitrary non-resonance frequency such that the turning angle velocity of the mirror 11 is kept substantially constant. In other words, the degree of freedom of control of the correction drive portions 40 and 50 is large, and hence the turning angle velocity of the mirror 11 can be kept substantially constant during the substantially entire period in one cycle of the oscillation. Consequently, the distance measuring apparatus 100 requires no control means configured to perform pulse control on the laser light 62a, and hence the structure of the distance measuring apparatus 100 can be simplified.

According to the first embodiment, as hereinabove described, the drive control portion 61d is configured to control the driving of the correction drive portions 40 and 50 such that the mirror portion oscillation angle in the oscillation of the mirror 11 by the correction drive portions 40 and 50 is 20% or less of the maximum value of the mirror portion oscillation angle in the oscillation of the mirror 11 by the resonant drive portions 14a and 14b. Thus, an increase in the size of the correction drive portions 40 and 50 can be suppressed. Furthermore, even if non-resonance driving is employed, the suppression of the increase in the size of the correction drive portions 40 and 50 can be easily achieved.

According to the first embodiment, as hereinabove described, the drive control portion 61d is configured to control the driving of the resonant drive portions 14a and 14b to satisfy the following expression (3) and control the driving of the correction drive portions 40 and 50 to satisfy the following expression (4) when the mirror portion oscillation angle at the time t is f (t), the maximum value of the mirror portion oscillation angle is $\underline{A}$, and the oscillation angle frequency of the mirror 11 is ω. Thus, the mirror portion oscillation angle of the mirror 11 has a waveform represented as a triangular wave, and hence the turning angle velocity of the mirror 11 can be effectively kept substantially constant during the substantially entire period in one cycle of the oscillation except for when the displacement direction of the mirror 11 is switched.

$$f_0(t) = A \cdot \sin(\omega t) \quad (3)$$

$$f_1(t) = A \cdot \sum_{n=1}^{\infty} \frac{B}{\pi^2} \left( \frac{1}{n^2} \sin\left(\frac{n\pi}{2}\right) \cdot \sin(n\omega t) \right) \quad (4)$$

According to the first embodiment, as hereinabove described, the waveform of the mirror portion oscillation angle in the oscillation of the mirror 11 by the correction drive portions 40 and 50 includes the waveform having the difference value between the mirror portion oscillation angle obtained by the driving of the resonant drive portions 14a and 14b and the angle of the triangular wave in the case where the turning angle velocity is substantially constant at each time, when the waveform of the angle in the case where the turning angle velocity is substantially constant is represented by the triangular wave. Thus, the turning angle velocity of the mirror 11 can be easily kept substantially constant.

According to the first embodiment, as hereinabove described, the vibrating mirror element 200 is provided with the resonant single-axis scanner drive circuit 61c connected to the drive control portion 61d, configured to drive the resonant drive portions 14a and 14b to oscillate the mirror 11 about the axis 300 at the resonance frequency and the correction actuator drive circuit 61e configured to drive the correction drive portions 40 and 50 to keep the turning angle velocity of the mirror 11 substantially constant by oscillating the mirror 11 about the axis 300 at the non-resonance frequency in the direction opposite to the direction in which the resonant drive portions 14a and 14b oscillate the mirror 11. Thus, the resonant single-axis scanner drive circuit 61c and the correction actuator drive circuit 61e are driven in a coordinated manner, whereby the correction drive portions 40 and 50 can be easily driven such that the turning angle velocity of the mirror 11 is kept substantially constant.

According to the first embodiment, as hereinabove described, the pair of correction drive portions 40 and 50 are provided outside the resonant drive portions 14a and 14b to hold the resonant drive portions 14a and 14b therebetween. Thus, the mirror 11 and the resonant drive portions 14a and 14b are corrected from both sides of the resonant drive portions 14a and 14b, and hence unnecessary movement of the mirror 11 and the resonant drive portions 14a and 14b other than the movement about the axis 300 can be suppressed. Consequently, the mirror 11 can be oscillated about the axis 300 such that the turning angle velocity thereof is more accurately kept substantially constant.

According to the first embodiment, as hereinabove described, the pair of correction drive portions 40 and 50 provided to hold the resonant drive portions 14a and 14b therebetween have a substantially identical structure and are configured to be substantially point-symmetric with each other about the center R of the mirror 11. Thus, the pair of correction drive portions 40 and 50 perform the same operation with respect to the same voltage, and hence the correction drive portions 40 and 50 can be easily controlled.

According to the first embodiment, as hereinabove described, the pair of resonant drive portions 14a and 14b are provided in the direction orthogonal to the axis 300 and are configured to be deformed in the directions opposite to each other, and the pair of correction drive portions 40 and 50 provided to hold the resonant drive portions 14a and 14b therebetween are configured to be driven in the directions opposite to each other. Thus, the resonant drive portions 14a and 14b deformed in the directions opposite to each other can be corrected such that the turning angle velocity of the mirror 11 is kept substantially constant.

According to the first embodiment, as hereinabove described, the correction drive portions 40 and 50 each are configured to have the meander shape to intersect with the axis 300 a plurality of times. Thus, the inclination angles of a plurality of deformed correction drive portions 40 and 50 can be accumulated, and hence the mirror 11 can be oscillated at a larger oscillation angle.

According to the first embodiment, as hereinabove described, the correction drive portion 40 (50) is configured to include a plurality of drive portions 41 to 44 (51 to 54) formed to extend in the direction orthogonal to the axis 300 and the coupling support portions 45 to 47 (55 to 57) formed to extend in the direction along the axis 300, coupling the plurality of drive portions 41 to 44 (51 to 54) to each other. Thus, the correction drive portions 40 and 50 can be easily formed in the meander shape to intersect with the axis 300 the plurality of times.

According to the first embodiment, as hereinabove described, the plurality of drive portions 41 to 44 (51 to 54) are configured such that the voltages opposite in phase to each other are applied to adjacent drive portions. Thus, a first end of each of the drive portions 41 to 44 (51 to 54) can be a free end, and a second end thereof can be a fixed end.

According to the first embodiment, as hereinabove described, the pair of correction drive portions 40 and 50 are provided outside the resonant drive portions 14a and 14b to hold the resonant drive portions 14a and 14b therebetween. Thus, oscillation of the light scanning portion 10 arranged inside the frame 16 can be corrected by the correction drive portions 40 and 50 arranged outside the frame 16, and hence the turning angle velocity of the mirror 11 can be more accurately kept substantially constant.

According to the first embodiment, as hereinabove described, the resonant drive portions 14a and 14b and the correction drive portions 40 and 50 are configured to include the piezoelectrically driven actuator. Thus, the response speed of the piezoelectrically driven actuator is faster than that of an electromagnetically-driven or electrostatically-driven actuator, and hence the correction drive portions 40 and 50 can be promptly driven. Consequently, the correction drive portions 40 and 50 can easily oscillate the mirror 11 at the arbitrary non-resonance frequency.

According to the first embodiment, as hereinabove described, the piezoelectrically driven actuator is configured to include the piezoelectric element layer 2 formed on the upper surface of the Si substrate 1, having the structure obtained by stacking the lower electrode 20, the piezoelectric body 21, and the upper electrode 22 from the side of the Si substrate 1. Thus, the actuator can be easily formed on the frame 16 (Si substrate 1).

Second Embodiment

The structure of a distance measuring apparatus 101 according to a second embodiment is now described with reference to FIG. 7. According to the second embodiment, the distance measuring apparatus 101 is configured to include a short-pulse laser light source and a distance measuring portion detecting light receiving time information by a light receiving portion, calculating a distance between the distance measuring apparatus and a measurement object from the detection result, unlike the aforementioned distance measuring apparatus 100 according to the first embodiment configured to include the CW laser light source and the distance measuring portion detecting light receiving position information, calculating the distance between the distance measuring apparatus and the measurement object from the detection result.

Figure 7:
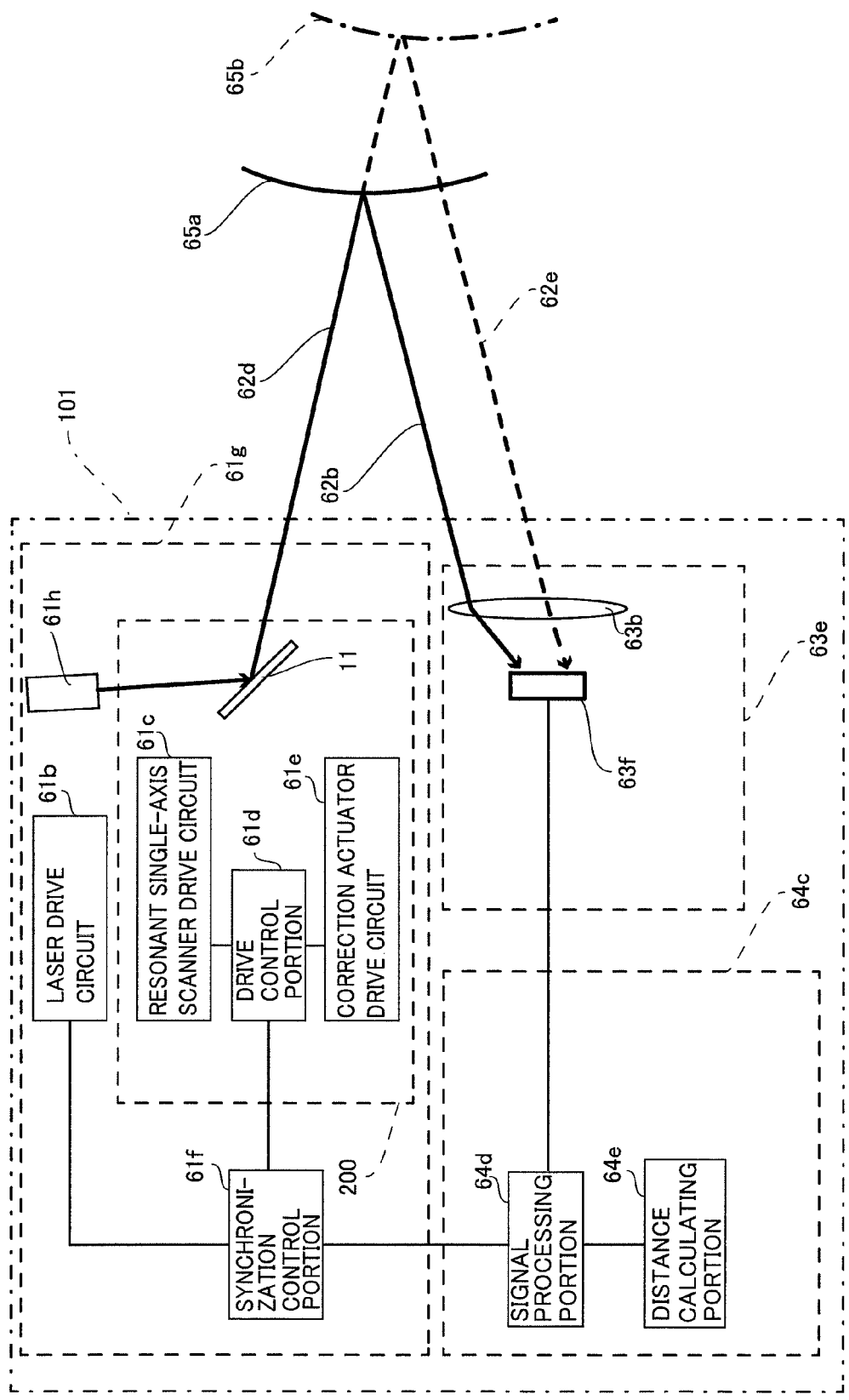
FIG. 7 is a block diagram showing the structure of a distance measuring apparatus according to a second embodiment of the present invention.

As shown in FIG. 7, the distance measuring apparatus 101 includes a light emitting portion 61g, a light receiving portion 63e receiving short-pulse laser light 62d emitted from the light emitting portion 61g and reflected by an measurement object 65a, and a distance measuring portion 64c acquiring a distance from the measurement object 65a on the basis of the detection result of the light receiving portion 63e. The light emitting portion 61g includes a short-pulse laser light source 61h emitting the short-pulse laser light 62d, a laser drive circuit 61b configured to drive the short-pulse laser light source 61h to emit the short-pulse laser light, a vibrating mirror element 200 configured to deflect the short-pulse laser light 62d emitted from the short-pulse laser light source 61h, and a synchronization control portion 61f electrically connected to the vibrating mirror element 200 and the laser drive circuit 61b, and the synchronization control portion 61f controls the short-pulse laser light source 61h and the vibrating mirror element 200 to be driven synchronously and transmits a synchronizing signal obtained by the synchronous driving to a signal processing portion 64d described later, electrically connected to the synchronization control portion 61f.

The light receiving portion 63e includes a condensing lens 63b configured to condense reflected light 62b reflected by the measurement object 65a and a PIN-PD (p-intrinsic-n photo diode) 63f capable of detecting the reflected light 62b transmitted through the condensing lens 63b, as shown in FIG. 7 and transmits a light receiving time signal obtained by receiving the light through the PIN-PD 63f to the signal processing portion 64d described later, electrically connected to the PIN-PD 63f. The time that the PIN-PD 63f receives the reflected light 62b obtained by reflecting the short-pulse laser light 62d by the measurement object 65a and the time that the PIN-PD 63f receives reflected light 62e obtained by reflecting the short-pulse laser light 62d by a measurement object 65b are different. The signal processing portion 64d outputs a difference between the time that the short-pulse laser light 62d is emitted from the short-pulse laser light source 61h and the time that the PIN-PD 63f receives the light and transmits the difference to a distance calculating portion 64e electrically connected thereto. The distance calculating portion 64e calculates a distance from the distance measuring apparatus 101 to the measurement object 65a on the basis of the signal obtained from the signal processing portion 64d (TOF (time of flight) method).

The remaining structure of the distance measuring apparatus 101 according to the second embodiment is similar to that of the distance measuring apparatus 100 according to the aforementioned first embodiment.

According to the second embodiment, the distance measuring apparatus 101 includes the short-pulse laser light source 61h and the light receiving portion 63e including the PIN-PD 63f capable of acquiring the light receiving time signal. Thus, the distance measuring apparatus 101 according to the second embodiment employs the light receiving portion 63e including the PIN-PD 63f or the like having a relatively simple structure, and hence the structure of the distance measuring apparatus 101 can be simplified, unlike the aforementioned distance measuring apparatus 100 according to the first embodiment employing the light receiving portion 63 having a relatively complicated structure, such as the PSD 63a.

The remaining effects of the distance measuring apparatus 101 according to the second embodiment are similar to those of the distance measuring apparatus 100 according to the aforementioned first embodiment.

Third Embodiment

The structure of a projector 102 according to a third embodiment is now described with reference to FIG. 8. In the third embodiment, the vibrating mirror element according to the present invention is applied to the projector, unlike in each of the aforementioned first and second embodiments in which the vibrating mirror element according to the present invention is applied to the distance measuring apparatus.

Figure 8:
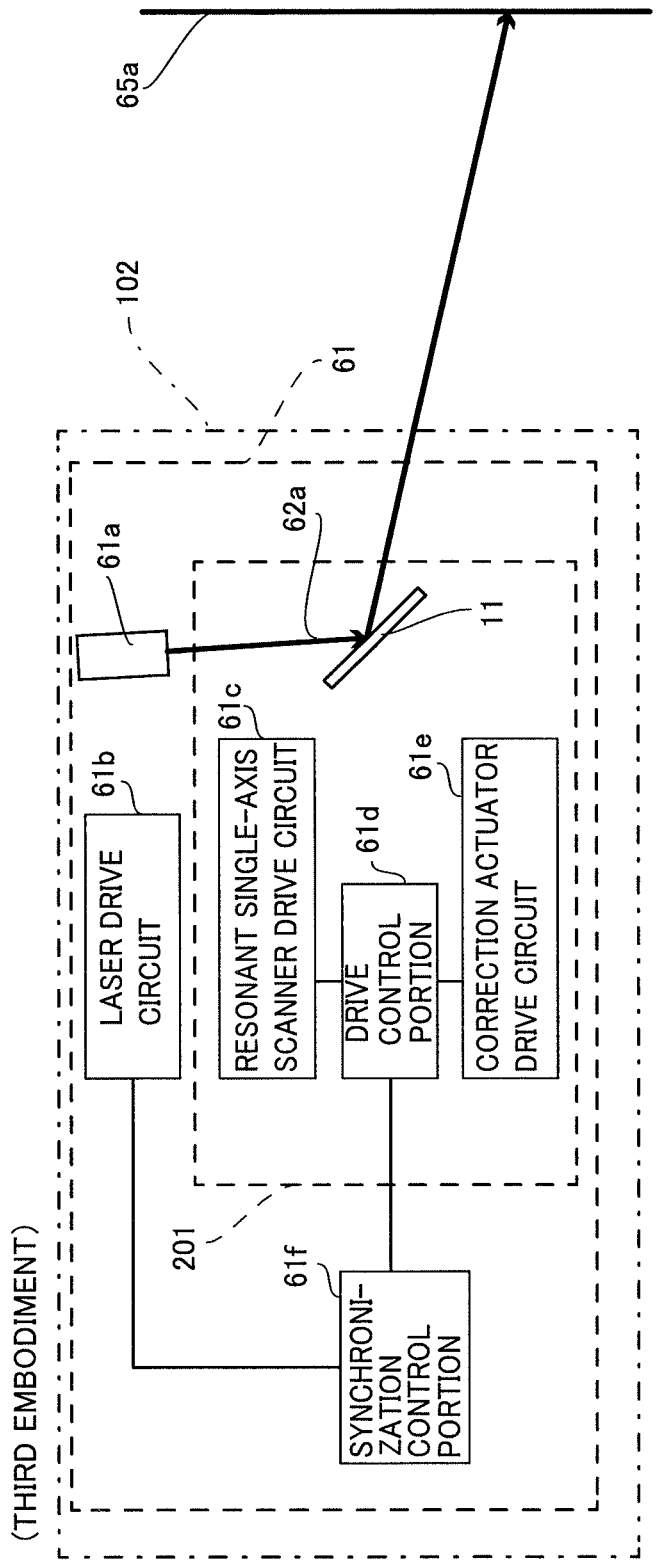
FIG. 8 is a block diagram showing the structure of a projector according to a third embodiment of the present invention.

As shown in FIG. 8, no light receiving portion 63 or distance measuring portion 64 is provided in the projector 102 according to the third embodiment, unlike in the aforementioned first embodiment. According to the third embodiment, a vibrating mirror element 201 includes at least two vibrating mirror elements 200 or is configured to be biaxially driven in order to deflect laser light 62a in a planar direction (an X-axis or Y-axis direction). The remaining structure of the projector 102 according to the third embodiment is similar to that of the distance measuring apparatus according to the aforementioned first embodiment.

According to the third embodiment, as hereinabove described, the vibrating mirror element in which the turning angle velocity is substantially constant is applied to the projector, whereby the laser light can be projected in a substantially entire cycle. Thus, an image not causing a feeling of strangeness can be projected, unlike the case where the turning angle velocity is not substantially constant.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the vibrating mirror element according to the present invention is applied to the distance measuring apparatus or the projector in each of the aforementioned first to third embodiments, the present invention is not restricted to this. The present invention is applicable to an apparatus other than the distance measuring apparatus and the projector. For example, the present invention is applicable to an image forming apparatus such as a laser printer.

While the distance measuring apparatus including the CW laser light source and the light receiving portion capable of detecting the position, calculating the distance between the distance measuring apparatus and the measurement object from the information about the light receiving position (triangulation method) or the distance measuring apparatus including the short-pulse laser light source and the light receiving portion, calculating the distance between the distance measuring apparatus and the measurement object from the information about the time from the light emission to the light reception (TOF method) is shown as an example of the distance measuring apparatus according to the present invention in each of the aforementioned first to third embodiments, the present invention is not restricted to this. For example, a distance measuring apparatus including a modulated laser light source and a light receiving portion, calculating a distance between the distance measuring apparatus and a measurement object from information about a difference in the phase of modulated laser light from the time of light emission to the time of light reception may alternatively be employed.

While the mirror has a circular shape in each of the aforementioned first to third embodiments, the present invention is not restricted to this. According to the present invention, the mirror may alternatively have a shape other than the circular shape. The mirror may alternatively have a polygonal shape, for example.

While the two resonant drive portions resonantly drive the mirror in each of the aforementioned first to third embodiments, the present invention is not restricted to this. According to the present invention, one resonant drive portion or three or more resonant drive portions may alternatively resonantly drive the mirror.

While the resonant drive portions each including the piezoelectric element layer resonantly drive the mirror in each of the aforementioned first to third embodiments, the present invention is not restricted to this. According to the present invention, resonant drive portions other than the piezoelectric element layer may alternatively resonantly drive the mirror. A drive unit including an elastomer held between electrodes may alternatively be employed, for example. In this case, the electrodes attract each other by applying a voltage to between the electrodes, whereby the elastomer may be compressed and the drive unit may be deformed.

While the eight drive portions of the correction drive portions correct the driving of the mirror in each of the aforementioned first to third embodiments, the present invention is not restricted to this. According to the present invention, nine or more drive portions or seven or less drive portions of correction drive portions may alternatively correct the driving of the mirror.

While the pair of correction drive portions are provided to hold the resonant drive portions therebetween using the center of the mirror as the center of the point symmetry in each of the aforementioned first to third embodiments, the present invention is not restricted to this. According to the present invention, the center of the mirror may not be used as the center of the point symmetry. The pair of correction drive portions may alternatively be arranged to be line-symmetric about the centerline of the mirror in the direction orthogonal to the axis, for example.

While the piezoelectric body 21 is made of lead zirconate titanate (PZT) in each of the aforementioned first to third embodiments, the present invention is not restricted to this. For example, the piezoelectric body may alternatively be made of a piezoelectric material of an oxide mainly composed of lead, titanium, and/or zirconium other than PZT or another piezoelectric material. More specifically, the piezoelectric body may be made of a piezoelectric material such as zinc oxide (ZnO), lead lanthanate zirconate titanate ((Pb,La)(Zr,Ti)O$_3$), potassium niobate (KNbO$_3$) or sodium niobate (NaNbO$_3$).

While the frame has a quadrilateral shape in each of the aforementioned first to third embodiments, the present invention is not restricted to this. According to the present invention, the frame may alternatively have a shape other than the quadrilateral shape. For example, the frame may alternatively have a circular shape or a polygonal shape.

While the PSD or the PIN-PD receives the reflected light in each of the aforementioned first to third embodiments, the present invention is not restricted to this. According to the present invention, the light receiving portion may not include the PSD or the PIN-PD. For example, the light receiving portion may alternatively include a CCD (charge coupled device) or an APD (avalanche photo diode).

What is claimed is:

1. A vibrating mirror element comprising:
a mirror portion capable of being oscillated about an axis;
a resonant drive portion resonantly driven at a resonance frequency to resonantly drive the mirror portion by oscillating the mirror portion about the axis;
a correction drive portion provided outside the resonant drive portion to be capable of oscillating the mirror portion about the axis, configured to non-resonantly drive the mirror portion by correcting oscillation driving of the mirror portion; and
a drive control portion configured to control driving of the resonant drive portion to oscillate the mirror portion about the axis at the resonance frequency and to control driving of the correction drive portion to keep a turning angle velocity of the mirror portion substantially constant by oscillating the mirror portion about the axis at a non-resonance frequency in a direction opposite to a direction in which the resonant drive portion oscillates the mirror portion.

2. The vibrating mirror element according to claim 1, wherein
the drive control portion is configured to control the driving of the correction drive portion such that a mirror portion oscillation angle in oscillation of the mirror portion by the correction drive portion is 20% or less of a maximum value of the mirror portion oscillation angle in oscillation of the mirror portion by the resonant drive portion.

3. The vibrating mirror element according to claim 1, wherein
the drive control portion is configured to control the driving of the resonant drive portion to satisfy a following expression (1) and control the driving of the correction drive portion to satisfy a following expression (2) when a mirror portion oscillation angle at time t is f (t), a maximum value of the mirror portion oscillation angle is A, and an oscillation angle frequency of the mirror portion is ω.

$$f_0(t) = A \cdot \sin(\omega t) \qquad (1)$$

$$f_1(t) = A \cdot \sum_{n=1}^{\infty} \frac{B}{\pi^2}\left(\frac{1}{n^2}\sin\left(\frac{n\pi}{2}\right) \cdot \sin(n\omega t)\right) \qquad (2)$$

4. The vibrating mirror element according to claim 1, wherein
a waveform of a mirror portion oscillation angle in oscillation of the mirror portion by the correction drive portion includes a waveform having a difference value between the mirror portion oscillation angle obtained by the driving of the resonant drive portion and an angle of a triangular wave in a case where the turning angle velocity is substantially constant at each time, when a waveform of the angle in the case where the turning angle velocity is substantially constant is represented by the triangular wave.

5. The vibrating mirror element according to claim 1, further comprising a resonant drive circuit connected to the drive control portion, configured to drive the resonant drive portion to oscillate the mirror portion about the axis at the resonance frequency and a correction drive circuit configured to drive the correction drive portion to keep the turning angle velocity of the mirror portion substantially constant by oscillating the mirror portion about the axis at the non-resonance frequency in the direction opposite to the direction in which the resonant drive portion oscillates the mirror portion.

6. The vibrating mirror element according to claim 1, wherein
a pair of correction drive portions are provided outside the resonant drive portion to hold the resonant drive portion therebetween.

7. The vibrating mirror element according to claim 6, wherein
the pair of correction drive portions provided to hold the resonant drive portion therebetween have a substantially identical structure and are configured to be substantially point-symmetric with each other about a center of the mirror portion.

8. The vibrating mirror element according to claim 6, wherein
a pair of resonant drive portions are provided in a direction orthogonal to the axis and are configured to be deformed in directions opposite to each other, and
the pair of correction drive portions provided to hold the resonant drive portions therebetween are configured to be driven in directions opposite to each other.

9. The vibrating mirror element according to claim 1, wherein
the correction drive portion has a meander shape to intersect with the axis a plurality of times.

10. The vibrating mirror element according to claim 9, wherein
the correction drive portion includes a plurality of drive portions formed to extend in a direction orthogonal to the axis and a coupling support portion formed to extend in a direction along the axis, coupling the plurality of drive portions to each other.

11. The vibrating mirror element according to claim 10, wherein
the plurality of drive portions are configured such that voltages opposite in phase to each other are applied to adjacent drive portions.

12. The vibrating mirror element according to claim 1, wherein
the resonant drive portion is arranged to surround the mirror portion and is deformably fixed inside a frame, and
the correction drive portion is deformably fixed outside the frame.

13. The vibrating mirror element according to claim 1, wherein
the resonant drive portion and the correction drive portion include a piezoelectrically driven actuator.

14. The vibrating mirror element according to claim 13, wherein
the piezoelectrically driven actuator includes a piezoelectric element layer formed on an upper surface of a Si substrate, having a structure obtained by stacking a lower electrode, a piezoelectric body, and an upper electrode from a side of the Si substrate.

15. A distance measuring apparatus comprising:
a light emitting portion including a vibrating mirror element emitting laser light to a measurement object;
a light receiving portion detecting the laser light emitted from the vibrating mirror element and reflected by the measurement object; and
a distance measuring portion acquiring a distance from the measurement object on the basis of a detection result of the light receiving portion, wherein
the vibrating mirror element includes:
a mirror portion capable of being oscillated about an axis,
a resonant drive portion resonantly driven at a resonance frequency to resonantly drive the mirror portion by oscillating the mirror portion about the axis,
a correction drive portion provided outside the resonant drive portion to be capable of oscillating the mirror portion about the axis, configured to non-resonantly drive the mirror portion by correcting oscillation driving of the mirror portion, and
a drive control portion configured to control driving of the resonant drive portion to oscillate the mirror portion about the axis at the resonance frequency and to control driving of the correction drive portion to keep a turning angle velocity of the mirror portion substantially constant by oscillating the mirror portion about the axis at a non-resonance frequency in a direction opposite to a direction in which the resonant drive portion oscillates the mirror portion.

16. The distance measuring apparatus according to claim 15, wherein
the drive control portion is configured to control the driving of the correction drive portion such that a mirror portion oscillation angle in oscillation of the mirror portion by the correction drive portion is 20% or less of a maximum value of the mirror portion oscillation angle in oscillation of the mirror portion by the resonant drive portion.

17. The distance measuring apparatus according to claim 15, wherein
the drive control portion is configured to control the driving of the resonant drive portion to satisfy a following expression (1) and control the driving of the correction drive portion to satisfy a following expression (2) when a mirror portion oscillation angle at time t is f (t), a maximum value of the mirror portion oscillation angle is A, and an oscillation angle frequency of the mirror portion is ω

$$f_0(t) = A \cdot \sin(\omega t) \quad (1)$$

$$f_1(t) = A \cdot \sum_{n=1}^{\infty} \frac{B}{\pi^2} \left( \frac{1}{n^2} \sin\left(\frac{n\pi}{2}\right) \cdot \sin(n\omega t) \right). \quad (2)$$

18. The distance measuring apparatus according to claim 15, wherein
a pair of correction drive portions are provided outside the resonant drive portion to hold the resonant drive portion therebetween.

19. The distance measuring apparatus according to claim 15, wherein
the correction drive portion has a meander shape to intersect with the axis a plurality of times.

20. A projector comprising a vibrating mirror element including:
- a scanning mirror portion oscillated about an axis, projecting an image;
- a resonant drive portion resonantly driven at a resonance frequency to resonantly drive the scanning mirror portion by oscillating the scanning mirror portion about the axis;
- a correction drive portion provided outside the resonant drive portion to be capable of oscillating the scanning mirror portion about the axis, configured to non-resonantly drive the scanning mirror portion by correcting oscillation driving of the scanning mirror portion; and
- a drive control portion configured to control driving of the resonant drive portion to oscillate the scanning mirror portion about the axis at the resonance frequency and to control driving of the correction drive portion to keep a turning angle velocity of the scanning mirror portion substantially constant by oscillating the scanning mirror portion about the axis at a non-resonance frequency in a direction opposite to a direction in which the resonant drive portion oscillates the scanning mirror portion.

* * * * *